US012716810B2

(12) United States Patent
Leclerc et al.

(10) Patent No.: US 12,716,810 B2
(45) Date of Patent: Aug. 25, 2026

(54) ADJUSTING THE POWER LEVEL OF A VISIBLE LIGHT SOURCE BASED ON A CHARACTERIZATION OF AN OPTICAL FIBER UNDER TEST

(71) Applicant: EXFO Inc., Québec (CA)

(72) Inventors: Michel Leclerc, Québec City (CA); Mario L'Heureux, Lévis (CA)

(73) Assignee: EXFO Inc., Québec (CA)

( * ) Notice: Subject to any disclaimer, the term of this patent is extended or adjusted under 35 U.S.C. 154(b) by 68 days.

(21) Appl. No.: 18/778,052

(22) Filed: Jul. 19, 2024

(65) Prior Publication Data

US 2025/0035509 A1 Jan. 30, 2025

Related U.S. Application Data

(60) Provisional application No. 63/516,223, filed on Jul. 28, 2023.

(51) Int. Cl.
*G01M 11/00* (2006.01)

(52) U.S. Cl.
CPC .... *G01M 11/3154* (2013.01); *G01M 11/3109* (2013.01)

(58) Field of Classification Search
CPC .............. G01M 11/3109; G01M 11/30; H04B 10/07955
See application file for complete search history.

(56) References Cited

U.S. PATENT DOCUMENTS

| | | | | |
|---|---|---|---|---|
| 6,734,411 | B1 * | 5/2004 | Imbsei | H04B 10/07955 250/227.16 |
| 9,641,243 | B2 | 5/2017 | Perron | |
| 11,480,496 | B2 * | 10/2022 | Perron | G01M 11/3145 |
| 2016/0356670 | A1 * | 12/2016 | Brillhart | H04B 10/07955 |
| 2018/0294873 | A1 * | 10/2018 | Martin | H04B 10/07955 |

OTHER PUBLICATIONS

Melontel, "How to use fiber optic adaptor??? ", https://www.youtube.com/watch?v=jJGcDTLFGqo&Ic=Ugypk6p5kQqxmArRXzh4AaABAg, Jul. 18, 2022, (Year: 2022).*
Shanghai Grandway Telecom Tech. Co. Ltd, VLS-8 Series Mini VFL, Specification sheet, www.grandway.com.cn, 2020.
AFL Test & Inspection, Specification sheet, VFI4 Visual Fault Identifiers, 2021-2022, VFI4-00-2000 Revision AB Apr. 7, 2022, AFLglobal.com.
Shanghai Grandway Telecom Tech. Co. Ltd, VLS-8 Series Mini VFL, Specification sheet, www.grandway.com.cn.

* cited by examiner

*Primary Examiner* — Maurice C Smith
(74) *Attorney, Agent, or Firm* — Baratta Law PLLC; Lawrence A. Baratta, Jr.

(57) ABSTRACT

Systems, methods, and devices for testing optical fibers are provided. According to one implementation, an optical fiber testing apparatus may include an optical test unit configured to obtain a characterization of an optical fiber to be tested. Additionally, the optical fiber testing apparatus may include a visible light source and an analysis and control device. For example, the analysis and control device may be configured to adapt the visible light source to a specific power level based on the characterization of the optical fiber.

20 Claims, 6 Drawing Sheets

60
56
54
52
58
50

62
OTDR pulse
66
54
64
56
52
50 reflection
66

- Analyze OTDR trace
- Calculate length and loss info
- Compute power boost amount
- Adjust visible light power 60
60
visible light
66
64

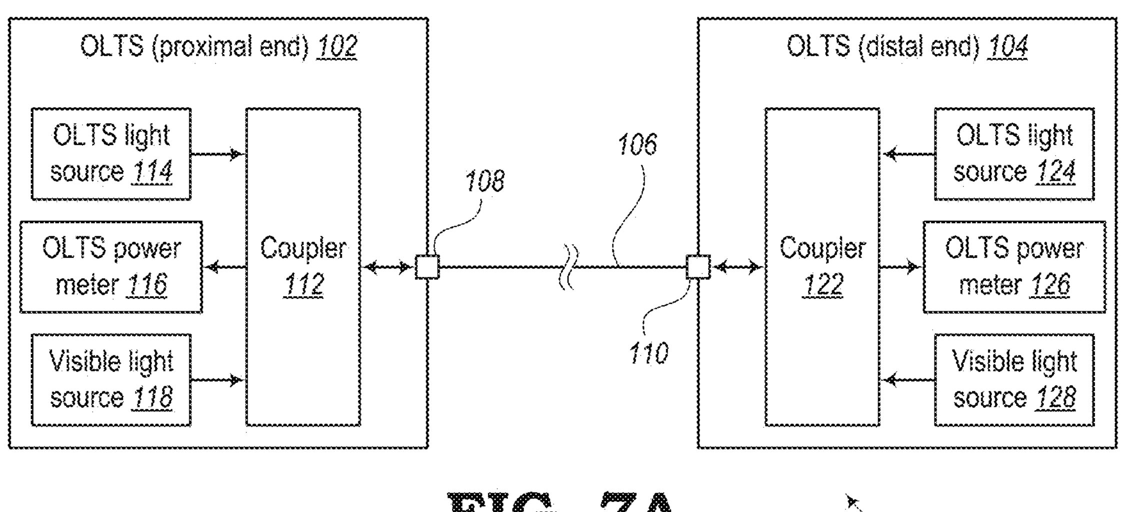
FIG. 7A
100
OLTS (proximal end) 132
OLTS light source 144
Visible light source 148
OLTS power meter 146
Coupler 142
136
138
OLTS (distal end) 134
Coupler 152
OLTS light source 154
Visible light source 158
OLTS power meter 156
FIG. 7B
130
160
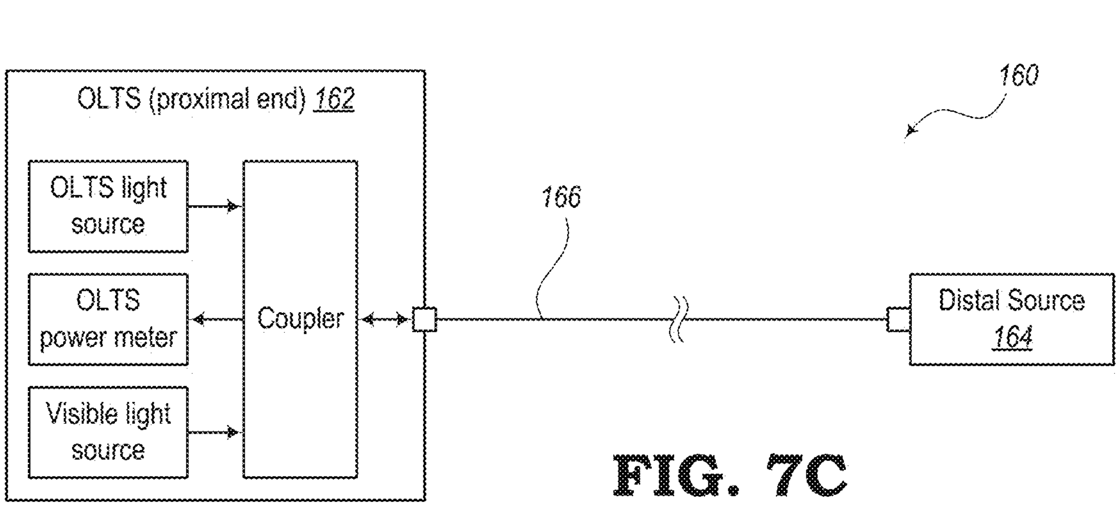
FIG. 7C

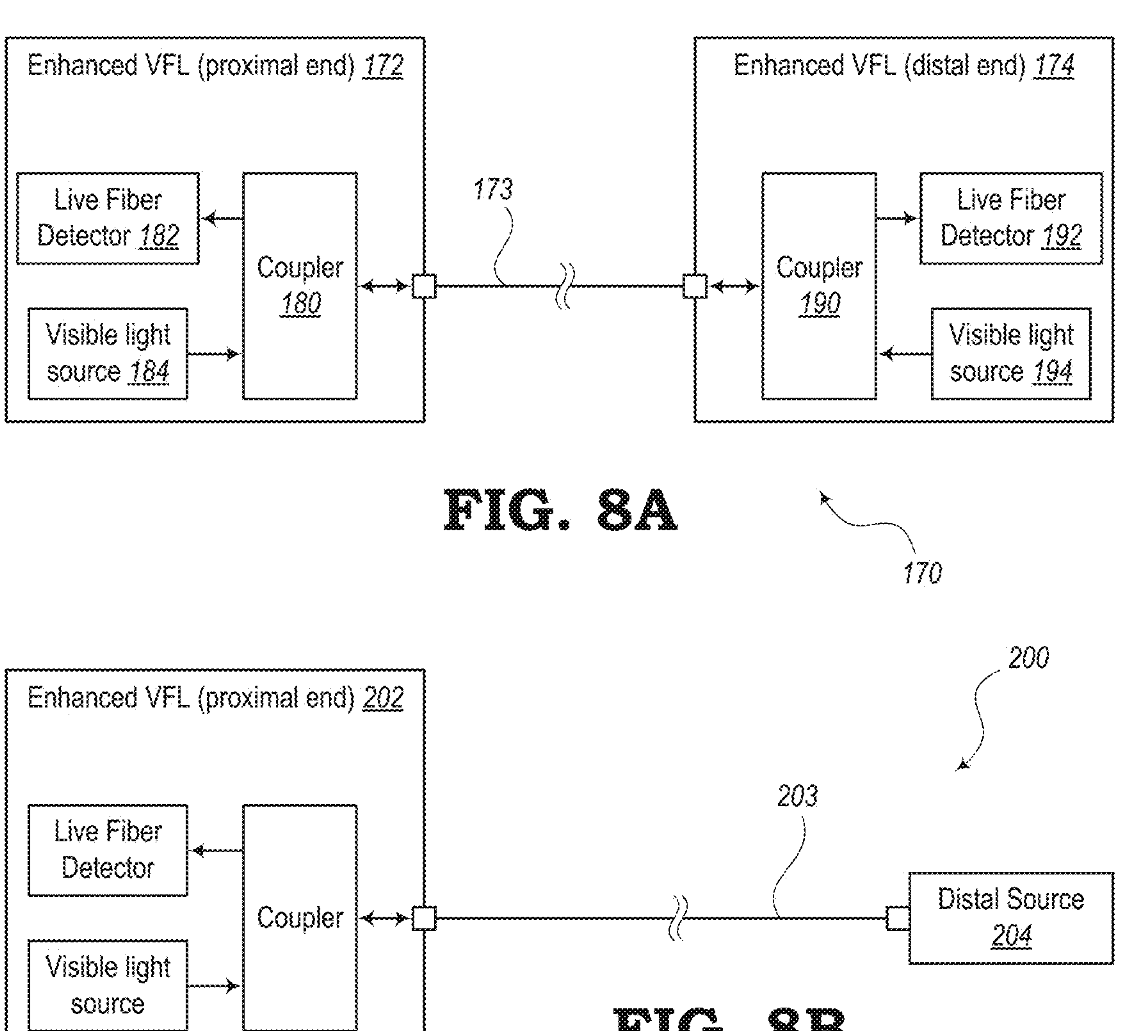
FIG. 8A
FIG. 8B
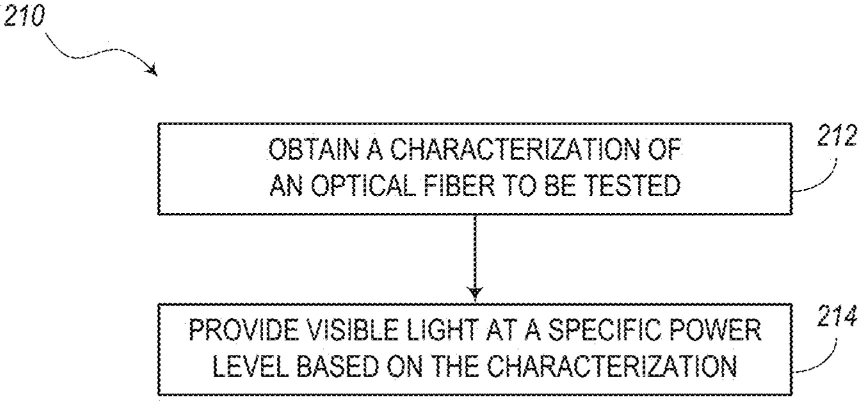
FIG. 9

ADJUSTING THE POWER LEVEL OF A VISIBLE LIGHT SOURCE BASED ON A CHARACTERIZATION OF AN OPTICAL FIBER UNDER TEST

CROSS-REFERENCE

The present disclosure claims priority to U.S. Provisional Patent Application No. 63/516,223, filed Jul. 28, 2023, the contents of which are incorporated by reference in their entirety.

TECHNICAL FIELD

The present disclosure generally relates to systems, methods, and devices for testing optical fibers. More particularly, the present disclosure relates to adjusting the power level of a visible light source, used for visually locating faults on an optical fiber, based on a scan or characterization of the optical fiber itself.

BACKGROUND

Fiber optic cables (or optical fibers) are used in communication networks for enabling the propagation of optical signals between network components. These fiber optic cables, which can extend for many kilometers, form the links or optical communication channels between network nodes. When operating properly, the fiber optical cables enable communication between these remotely separated nodes. During installation of network equipment or during optical fiber testing, a technician may use a Visual Fault Locator (VFL) for testing these links and their connections to network devices. The VFLs, for instance, may also be referred to as visual fault identifiers, visual fault locators, visual fault detectors, visual fault finders, fiber tracers, fiber continuity testers, among other names. Fault testing can be performed to ensure that the fibers are in good condition and are properly connected in the system. In use, the VFL emits light that is visual to the human eye. Thus, when the light is injected into a fiber, the technician can visually detect faults, which will be revealed by light escaping from a break in the fiber, from a defective connector, from a poorly connected fiber, from a sharp bend in the fiber, etc. When these faults are exposed, the technician can easily spot them and take corrective actions. Also, the VFL can be used to identify a fiber, e.g., when there are many cables in a given location and the labeling is deficient or wrong. Here, a user can create a temporary bend in the fiber or look at the end of the cable to detect the light. Other than VFLs, technicians may also use other types of fiber testing devices, such as Optical Time Domain Reflectometry (OTDR) devices and Optical Loss Test Set (OLTS) devices, which normally operate at wavelengths outside the range of typical VFL devices.

BRIEF SUMMARY

The present disclosure is directed to testing optical fibers using a combination of light sources. A first light source (e.g., for creating an optical test pulse used for Optical Time Domain Reflectometry (OTDR), etc.) may be used for obtaining a characterization of the optical fiber under test (e.g., OTDR scan, OTDR trace, power level graph, attenuation and loss graph, etc.). A second light source (e.g., for creating light that is visible to the human eye, such as those used in a Visual Fault Locator (VFL) or the like) may be used for allowing a user to visually locate faults and events along the optical fiber and/or to visually locate the end of the optical fiber. The intensity of the visible light of the second light source may be adjusted such that the light is high enough that the user can easily see it, yet low enough that it does not damage the user's eyes. Thus, the second light source can be adjusted accordingly based on the detected characterization.

According to one implementation, an optical fiber testing apparatus may include an optical test unit configured to obtain a characterization of an optical fiber to be tested. The optical fiber testing apparatus may also include a visible light source and an analysis and control device. The analysis and control device may be configured to adapt the visible light source to a specific power level based on the characterization of the optical fiber.

In some embodiments, the characterization of the optical fiber may include at least a fiber length metric calculated from the optical fiber testing apparatus to a distal end of the optical fiber. The characterization of the optical fiber may further include a loss metric related to each of one or more events in the optical fiber. For example, the loss metric may be related to a power loss associated with the respective event. The specific power level, to which the visible light source is set, may be based on one or more of a) the fiber length metric, b) the loss metric of each event, and c) an inherent attenuation characteristic of the optical fiber.

The optical test unit may be configured to apply a test pulse to the optical fiber and receive a reflection signal from the optical fiber. Also, the analysis and control device may be configured to perform a signal analysis procedure on the reflection signal to detect one or more events of the optical fiber and to detect a length to the end of the optical fiber. The optical test unit and analysis and control device may use OTDR technology. Each event, for example, may be a fault, a break, a crack, a splice, a substantial bend, or an intermediate connector.

Furthermore, the characterization of the optical fiber may include at least a connectivity status related to a) a first connection between a proximal end of the optical fiber and the optical fiber testing apparatus and b) a second connection between of a distal end of the optical fiber and a cooperating testing device. The specific power level, to which the visible light source is set, may be based on the connectivity status. For example, the optical fiber testing apparatus and cooperating testing device may be arranged in an Optical Loss Test Set (OLTS) configuration. The cooperating testing device may be an OLTS device, enhanced Visual Fault Locator (VFL) device, or other type of distal optical network device having an optical source.

In some implementations, the optical fiber testing apparatus may further include a coupler and a singular optical port, where the singular optical port may be configured for connection with the optical fiber. The coupler may be configured to enable the optical test unit to transmit optical test pulses to the optical fiber via the coupler and singular optical port and to receive reflection signals from the optical fiber via the singular optical port and coupler. The visible light source may be configured to apply visible light at the specific power level to the optical fiber via the coupler and singular optical port. The optical test pulses, for example, may include one or more wavelengths within a range of about 850 nm to about 1650 nm, and the visible light, for example, may include one or more wavelengths within a range of about 400 nm to about 700 nm. In addition, there can be a characterization mode and a visible light mode. The characterization mode, for example, may enable the passage of the optical test pulses and reflection signals through the coupler. On the other hand, the visible light mode may enable the passage of the visible light through the coupler.

The optical fiber testing apparatus may further include a visible light filter arranged between the optical test unit and the coupler. The coupler, in this case, may be configured as a fiber optic coupler (e.g., Y coupler) configured to enable the passage of the visible light from the visible light source simultaneously with the passage of the optical test pulses and reflection signals with respect to the optical test unit. As such, the visible light filter may be configured to prevent potential damage to a photodetector of the optical test unit caused by incoming signals of visible light, i.e., the objective is to avoid live fiber detection of the VFL light by the APD.

In some embodiments, the processes of obtaining the characterization of the optical fiber and adapting the visible light source accordingly may be repeated periodically (e.g., every 500 msec) to respond to changes in the optical fiber occurring in real time. The analysis and control device may be configured to boost the power of the visible light source to such a level that a) application of the boosted power to the optical fiber results in escaping light being emitted outside the optical fiber at an intensity that is safely detectable by the human eye, and b) detection range of the optical fiber testing apparatus is increased.

According to another implementation, the present disclosure describes a method for testing an optical fiber. In this implementation, the method may include the step of obtaining a characterization of an optical fiber to be tested. Next, the method may include the step of providing visible light at a specific power level based on the characterization.

Furthermore, the step of obtaining the characterization may include the steps of a) transmitting an Optical Time Domain Reflectometry (OTDR) test pulse on a proximal end of the optical fiber, b) scanning the optical fiber to obtain an OTDR trace, and c) analyzing the OTDR trace to determine a fiber length metric related to a distance along the optical fiber from a scanning location to a distal end of the optical fiber. The step of obtaining the characterization may further include the step of analyzing the OTDR trace to determine one or more events in the optical fiber and to determine a loss metric related to each of the one or more events. The loss metric, for example, may be related to a power loss associated with the respective event.

In some embodiments of the method, the step of obtaining the characterization may include the step of determining a connectivity status of a distal end of the optical fiber with respect to a cooperating testing device. Also, the step of providing the visible light at the specific power level may be based on the connectivity status. The step of obtaining the characterization may also include the step of transmitting and receiving test signals via a singular optical port connected to the optical fiber, whereby the step of providing the visible light may include the step of transmitting the visible light to the optical fiber via the singular optical port.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIGS. 7A-7C are schematic diagrams illustrating various embodiments of testing systems in which an Optical Loss Test Set (OLTS) device is connected to one or both ends of an optical fiber under test.

FIGS. 8A and 8B are schematic diagrams illustrating various embodiments of testing systems in which an enhanced VFL device is connected to one or both ends of an optical fiber under test.

FIG. 9 is a flow diagram illustrating a method for testing an optical fiber, according to various embodiments.

DETAILED DESCRIPTION

Figure 1:
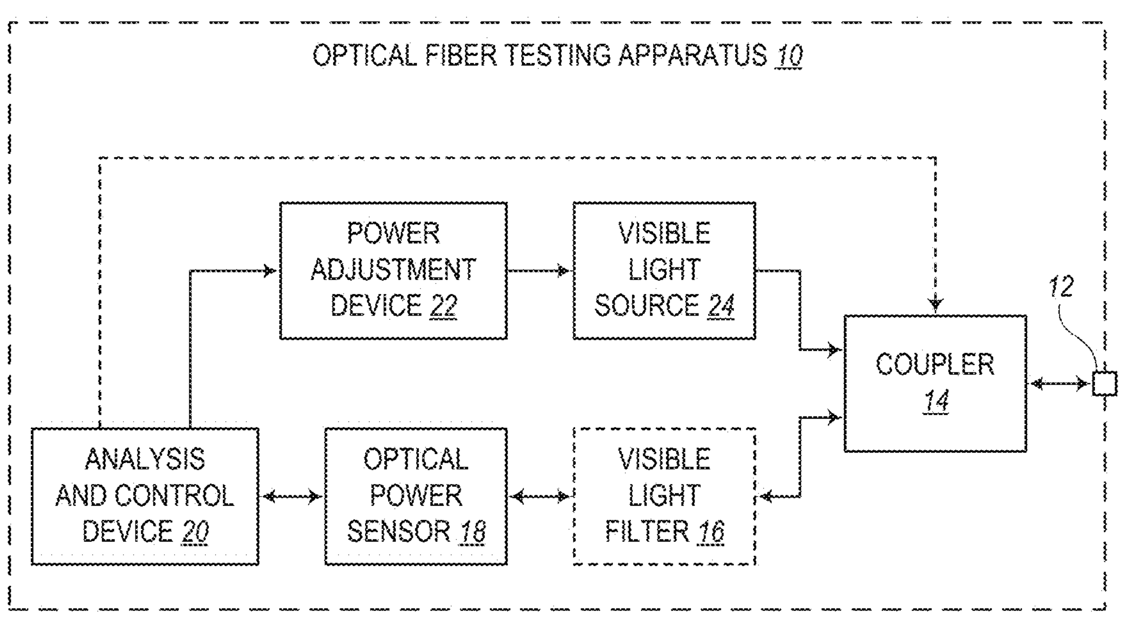
FIG. 1 is a block diagram showing an optical fiber testing apparatus that combines the features of an Optical Time Domain Reflectometry (OTDR) device and a Visual Fault Locator (VFL) device, according to various embodiments.

The present disclosure relates to systems, methods, and devices for testing optical fibers for faults or other events and for locating a distal end of the optical fibers. Again, these optical fibers may be those used as links in communications networks. In the past, Visual Fault Locators (VFLs) were simple, inexpensive devices that produced low levels of power to enable a light source (e.g., laser) to generate low intensity light, at safe levels. Typically, a VFL may produce light having a wavelength of about 650 nm (referred to as "red" light). Generally, it was not an issue for a technician to look at any light escaping through the jacket of the fiber. However, at the opposite end of the fiber, where a majority of the laser light would exit, the light generated by the VFL could potentially be harmful if it were accidentally pointed directly into the eyes of the technician. Therefore, extreme caution would be needed during use to prevent damage to the eyes.

On the other hand, testing a long fiber would generally have issues as well. For example, due to attenuation of the light signals as a function of the length of the fiber and the distance that the signals travel, the range of a VFL would be limited. Also, if a VFL is used in a bright environment, such as in direct sunlight, the light from the VFL may not be bright enough, which can affect the ability of the technician to see the light and discover any issues or the ability to identify the lighted fiber link. In these cases, a solution would be to construct a VFL that is able to generate higher power and emit light at a higher intensity level. A problem with this solution, however, is that the higher intensity light can cause permanent damage to human eyes. Not only can these high power devices create a greater risk of eye damage, but also they may exceed various standards and restrictions imposed in different countries.

For example, in many countries, certain laser light classifications are enforced on manufacturers for the protection of consumers or users. Also, different countries have safety regulations for the proper use of devices that incorporate such laser sources. Nevertheless, some users may still wish to use more powerful VFLs despite the safety risks and might even purchase devices that do not comply with the safety regulations within some countries. Most reputable manufacturers, however, will produce VFLs that limit the power output to safe levels, while less reputable manufacturers might offer powerful devices that can be potentially harmful.

The Maximum Permissible Exposure (MPE) is defined as the highest power or energy density (in W/cm2 or J/cm2) of a light source that is considered safe. A "Class 1" laser product is defined as being safe under all conditions of normal use, which means that the MPE cannot be exceeded when viewing the laser light with the naked eye or even when viewing with the aid of magnifying optics. A "Class 1M" laser product is defined as being safe for all conditions of use except when used with magnifying optics. "Class 2" and "Class 2M" laser products are defined as being safe if used with limited exposure as long as the user does not intentionally stare at the light. Classes 2 and 2M are limited to a power output of 1.0 mW. A "Class 3R" laser product is defined as being safe if handled carefully, with restricted beam viewing. With a Class 3R laser, the MPE can be exceeded, but with a low risk of injury. That is, Class 3R devices are limited to 5.0 mW. A "Class 3B" laser product is defined as being hazardous if the eye is directly exposed and usually requires protective eyewear during use. A Class 3B device may have a power output of up to 500.0 mW. A "Class 4" laser product is defined as the highest and most dangerous class of lasers and can cause permanent damage to the eyes and can even burn the skin, even if the beam is diffused. Hence, relatively safe VFLs may be classified as Class 2 or 2M devices, while some VFLs on the market may be classified as Class 3R or 3B devices.

Therefore, there is a need in the field of fiber optic testing for providing a VFL that operates at a safe level but also allows a user to safely increase the power in a controlled manner when extra power is needed. Until now, VFLs on the market are only able to generate light at one power level. If the power level of conventional devices is set too low, then the range may be greatly limited, or it may be difficult for the technician to use in certain bright environments. If the power level of conventional devices is set too high, then the device can pose a safety risk to its users. By producing a VFL that can operate at multiple levels, as described in the present disclosure, these improved VFLs can resolve many of the issues of the conventional VFLs.

In addition, the present disclosure provides other solutions for testing optical fibers, which would allow operation at a high-power mode for increasing the effective range while also having safety features that would return the power of the visible light source to a safe level as needed to reduce the risk of eye damage. That is, the features of adjusting the power of a visible light source (e.g., such as is described in related U.S. patent application Ser. No. 18/664,669, filed May 24, 2024, the contents of which is incorporated by reference herein) can be provided in the present embodiments. However, instead of relying on user input to increase or decrease the light intensity, the embodiments of the present disclosure are configured to use other detection devices to analyze or characterize the optical fibers under test and then automatically adjust the power levels based on this characterization.

Thus, the embodiments of the present disclosure describe the combination of two types of testing sub-systems into one apparatus, such as by incorporating one type of sub-system within another. One sub-system, for example, may include visible light sources (e.g., those used in a typical VFL) in other fiber testing equipment, such as Optical Time Domain Reflectometry (OTDR) devices, Optical Loss Test Set (OLTS) devices, etc. In this way, the embodiments of the present disclosure may include fiber testing system having built-in VFL functionality. The embodiments may include using testing systems that operate at certain wavelengths (e.g., 850 nm, 1300 nm, 1310 nm, 1550 nm, etc.), which are outside of a range that may be visible to human eyes (e.g., 400 nm to 700 nm). Therefore, in addition to regular functions of the OTDR and OLTS devices, the fiber testing devices of the present disclosure may also include inline VFL functionality. That is, the devices can combine a test signal (e.g., OTDR test light, OLTS test light, etc.) for obtaining a scan or characterization of the optical fiber under test and a VFL-type test signal (i.e., visible light) for causing visible light to be emitted from a fault in the optical fiber or from an unconnected distal end of the optical fiber. Based on distance characteristics and loss characteristics of End of Fiber (EOF), the power level of the visible light source can be adjusted accordingly. That is, the fault location is the EOF and multiplying the location from the OTDR with the attenuation in dB per km of the VFL light, (typically 6 dB/km), the power level of the VFL light source can be adjusted accordingly. Note that the loss characteristics of events before the fault or EOF could also be taken into account but for most cases, it is the attenuation of the VLF light largely dominate.

Stated differently, the length of the fiber determined between the VFL and the EOF, the optical fiber loss of this fiber is determined at the VFL wavelength based on the fiber length and the attenuation value at the VFL wavelength, and the power level of the VFL is adjusted using the optical fiber loss so that the power level of VFL light that outputs at the EOF remains below a safety level. Optionally, insertion loss values of events along the fiber to the optical fiber loss may also be included. This enables a high-power visible light mode which allows for dynamically adapting the VFL power as a function of the fiber under test connected to an optical test port. The longer the optical fiber link, the greater the insertion loss at the visible light wavelength and the greater the power that can be injected in the optical fiber link without sacrificing eye safety at any detectable fault location along the length of the fiber or at the EOF.

For better eye safety, the power of the VFL-type visible light may be automatically adjusted so that any light that escapes from any deficiency or inconsistency along the fiber length or at the EOE would stay within the laser security range at that light escaping location. If no optical fiber link is connected to the optical test port, the visible light source may be set to a normal-power mode. Once it is determined that an optical fiber link is connected, the VFL power is adjusted as a function of the length or loss of the link between the test device and the location of the fault or EOF. The feature of dynamically adjusting the power level of an inline visible light source based on a characterization of the fiber under test, as described in the present disclosure, is believed to be unique and provide safety advantages with respect to conventional fiber testing systems.

For example, in the case of an OTDR test device, an OTDR procedure may be configured to obtain a trace or characterization of the fiber that can be analyzed to locate certain features or conditions of the fiber, such as faults, splices, additional connectors, bends, cracks, breaks, EOF, etc. The fiber trace can then be analyzed to set a (boosted) power level of the visible light as a function of the determined distance to the specific fiber inconsistencies (e.g., fault, EOF, etc.). Because of inherent attenuation along the length of the fiber, the escaping light at the inconsistency is calculated such that it would not pose a danger to the eyes of the technician by maintaining safe power levels at the location of the distal end of the fiber. In the case of an OLTS device, the high-power light signal may be activated when a signal is received from a remote test device at the distal end of the fiber.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram showing an embodiment of an optical fiber testing apparatus 10 for testing an optical fiber. The optical fiber testing apparatus 10 is configured to combine features of an OTDR device and a VFL device and communicate with the optical fiber under test via a singular optical port 12. As illustrated, the optical fiber testing apparatus 10 includes a coupler 14, a visible light filter 16, an optical test unit 18, an analysis and control device 20, a power adjustment device 22, and a visible light source 24. In some embodiments, the visible light filter 16 may be omitted, such as in the case when the optical test unit 18 only analyzes reflection signals when the visible light source 24 is turned off and there is not risk with respect to damage to sensitive photodetectors of the optical test unit 18. In some embodiments, the optical test unit 18 may be configured as an OTDR device, optoelectronic instrument, or other type of fiber scanning device for detecting characteristics of the optical fiber under test.

Figure 2:
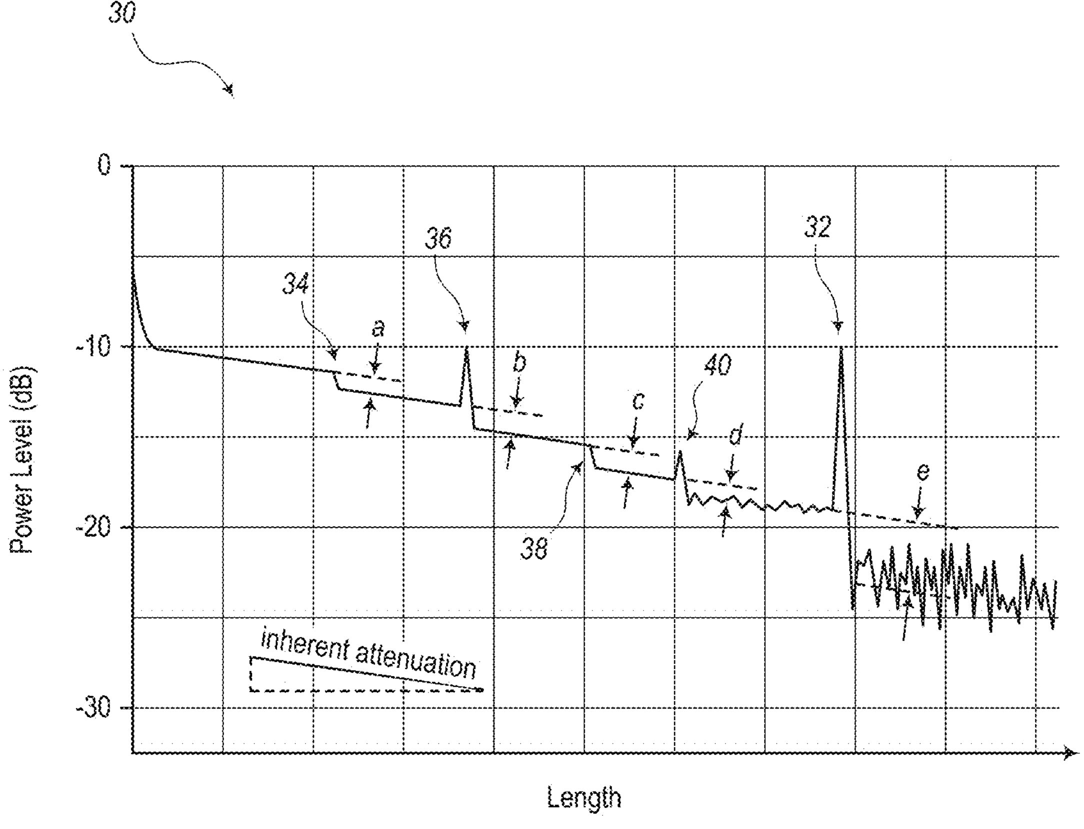
FIG. 2 is a graph showing an example of an OTDR trace of an optical fiber under test.

In operation, the optical test unit 18 is configured to generate test pulses that are applied to the coupler 14 and injected into the optical fiber. Also, the optical test unit 18 is configured to receive reflection signals from the optical fiber. These reflection signals (e.g., Rayleigh backscatter signals) may be used to generate a scan. For example, FIG. 2 shows an example of an OTDR trace 30 (e.g., fiber scan, characterization, reflection signals, etc.). The analysis and control device 20 is configured to analyze the OTDR trace 30 or other reflections or scans to detect loss metrics of the EOF 32 and to detect other events, irregularities, imperfections, faults, etc. along the length of the optical fiber under test. As shown in the example of FIG. 2, the OTDR trace 30 may also detect loss metrics related to a bend 34 in the optical fiber, an immediate connector 36 in the optical fiber, a splice 38 in the optical fiber, and a break 40 or crack in the optical fiber. The OTDR trace 30 also shows the loss metrics, which are labelled a, b, c, d, and e with respect to each of the bend 34, immediate connector 36, splice 38, break 40, and EOF 32, respectively.

As described in the present disclosure, the various reflection signals, identification of events, detection of loss parameters at the events and EOF, etc. may be referred to as a "characterization" of the optical fiber. In additional embodiments, the characterization may further refer to connectivity information, such as whether or not the optical fiber is properly connected to testing equipment at its proximal end (e.g., connected to the singular optical port 12) and at its distal end (e.g., connected to a cooperating test device, such as an OLTS device). It should also be noted that the reception of the reflection signals may be analyzed with respect to power levels over time. With OTDR, reflection time can be used to calculate distance or length with respect to the optical fiber under test.

The analysis and control device 20 analyzes the OTDR trace 30 and obtains the length (or distance) metrics and loss metrics a, b, c, d, and e. Also, based on an inherent attenuation characteristics, a time-delay (related to length), and signal strength of the reflections, the analysis and control device 20 may be configured to determine how much visible light can be supplied to the optical fiber such that any exposure to the user's eyes will allow the user to easily see light escaping from the optical fiber while also keeping the power level low enough where it will not damage the user's eyes.

Based on this analysis, the analysis and control device 20 is configured to apply a signal to the power adjustment device 22 to instruct the power adjustment device 22 to set the power level of the visible light source 24 accordingly (i.e., to allow visibility of escaping light without causing eye damage). Furthermore, the analysis and control devices 20 may be configured, in some embodiments, to provide a switch between a test mode and a visible light mode. In the test mode, the optical test unit 18 is configured to transmit test pulses to the optical fiber via the singular optical port 12 and to receive reflection signals from the optical fiber. In the visible light mode, the visible light source 24 is configured to transmit light at visible wavelengths to the optical fiber via the singular optical port 12. Thus, the optical sources operate one at a time.

According to some embodiments, the visible light filter 16 may be omitted. For example, if the analysis and control device 20 is configured to control the coupler 14 such that only one source is utilized at a time, then the visible light filter 16 may not receive visible light feedback when the optical power source 18 is operating and therefore would not need to filter the visible light that could cause problems for photosensors of the optical test unit 18.

On the other hand, according to other embodiments, the coupler 14 may be configured as a fiber optic coupler (e.g., Y coupler) such that the two sources may be configured to operate in an overlapping or simultaneous manner. In this case, the visible light filter 16 may be needed and can filter any visible light from the coupler 14 in order to protect the sensitive photodiode components during the simultaneous operation of the optical test unit 18.

The analysis and control device 20 is configured to provide power adjustment for the visible light source 24 as needed to correspond or counteract attenuation along the length of the optical fiber. This function keeps the optical fiber testing apparatus 10 operating according to Class 1 laser specifications at the remote open connector locations.

Also, the analysis and control device 20 provides control of which source is active at any time.

The wavelengths associated with the optical test unit 18 may include 850 nm, 1300 nm, etc. for multimode fibers and/or 1310 nm, 1550 nm, 1625 nm, 1650 nm, etc. for single mode fibers. It may be noted that the OLTS systems described with respect to FIGS. 7A-7C may use these same wavelengths. The visible light from the visible light source 24 may have wavelengths in the range of about 400 nm to about 700 nm. For instance, a wavelength of 650 nm may be used for emission of "red" light.

The OTDR trace 30 can be used to determine the distance or range to an event. Also, the attenuation characteristics of the optical fiber under test may be known beforehand, but may also be detected based on the decrease in the power level (in dB) over the length (in km) of the optical fiber. For example, a typical optical fiber may attenuate optical signals by 6 dB per km (or more). Therefore, if, for example, the range (length) to a fault is 2 km, the power level may be boosted by about 12 dBm such that escaping light might be attenuated by about the same amount, thereby maintaining a consistent visible light level that might escape from or be emitted from the optical fiber.

FIGS. 3A-3E are diagrams illustrating embodiments of a sequence of testing procedures using a test device 50 (e.g., optical fiber testing apparatus 10). The test device 50 may include a port 52 to which an optical fiber 54 to be tested can be connected. For example, the optical fiber 54 may include a connector 56 at a proximal end, where the connector 56 may be configured for connection with the port 52.

Figures 3A, 3B, 3C, 3D, 3E:
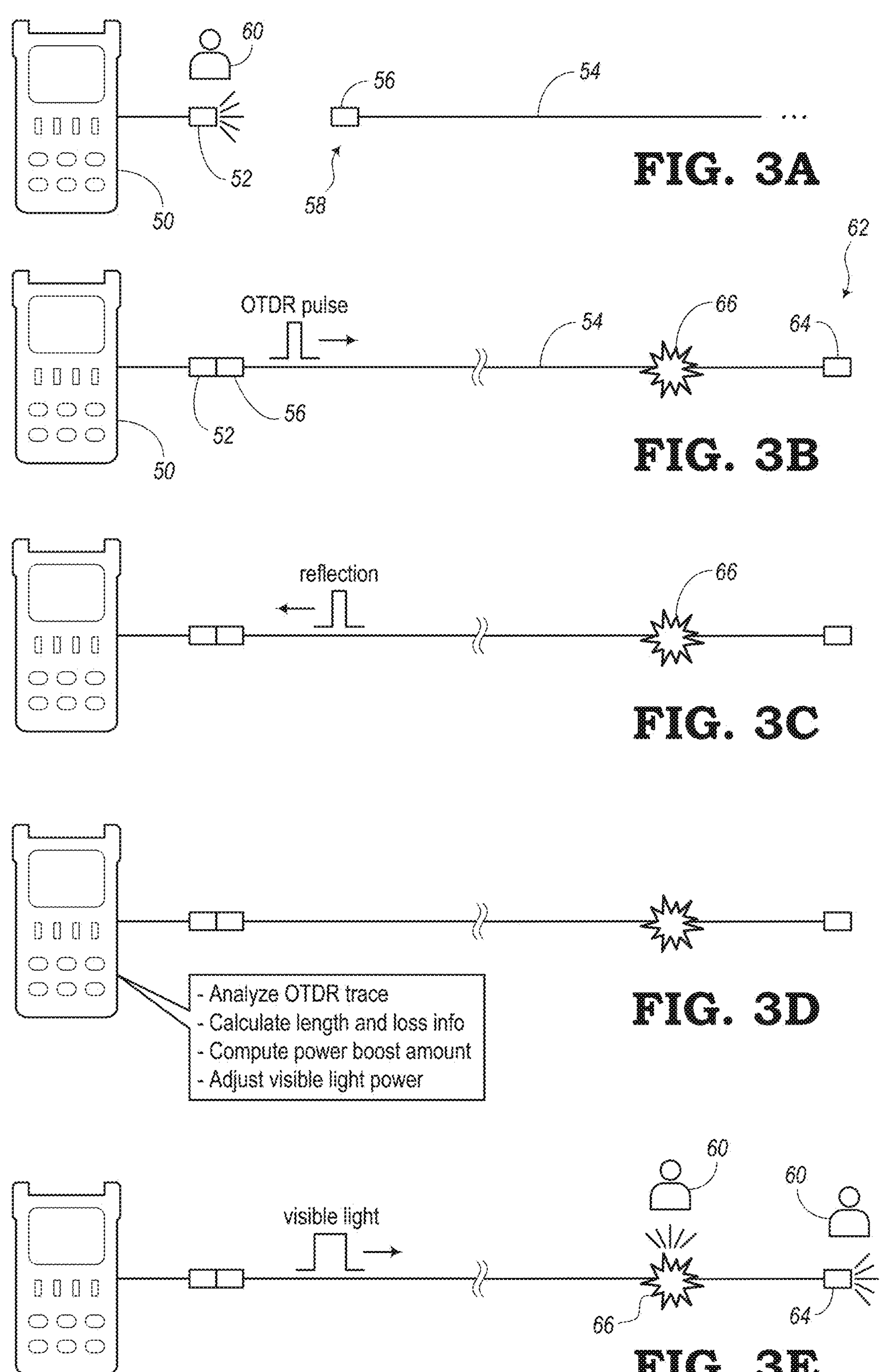
FIGS. 3A-3E are diagrams illustrating embodiments of a sequence of testing procedures using the optical fiber testing apparatus of FIG. 1.

As shown in FIG. 3A, before the connector 56 is connected to the port 52, if the test device 50 is turned on, the test device 50 may be configured to either keep a visible light source (not shown in FIGS. 3A-3E) turned off or initially turn on the visible light source at a low level. Thus, if any visible light is emitted from the port 52, the power level will be low enough where the visible light will not harm the eyes of the user 60 (or technician).

As shown in FIG. 3B, after the connector 56 has initially been connected to the port 52, the test device 50 may be configured to start a power sensing or fiber scanning procedure. This may include, for example, the transmission of an OTDR pulse along the optical fiber 54. FIG. 3B also shows a distal end 62 of the optical fiber 54 and a second connector 64. In this example, the optical fiber 54 may further include some type of event 66, such as a fault, break, bend, splice, etc. that might cause a power loss and/or reflections of the OTDR pulse.

As shown in FIG. 3C, a reflection of the OTDR pulse is received back at the test device 50. For example, the reflection may be indicative of an OTDR trace (e.g., OTDR trace 30 shown in FIG. 2) and can be used to provide a characterization of the optical fiber 54. In this example, the OTDR trace of the reflection may show loss information and distance (length) information with respect to the EOF or distal end 62 and/or information respect to the event 66.

As shown in FIG. 3D, the test device 50 may include circuitry (e.g., optical test unit, analysis and control device, etc.) that may be configured to analyze the OTDR trace, calculate the length and loss information of various features of the optical fiber 54, compute a power boost amount that would be appropriate (based on the loss and length metrics) for counteracting the loss and attenuation (based on length), and then actually adjusting a visible light source to the appropriate power level.

Then, as shown in FIG. 3E, the test device 50 is configured to provide visible light along the optical fiber 54. It may be noted that the user 60 (or other user or users) may be able to visually observe visible light leaking from the optical fiber 54 at the event 66 and/or visually observe visible light emitted from the connector 64 at the distal end 62 of the optical fiber 54 (i.e., if the connector 64 is not connected to other equipment or is improperly connected).

This sequence as shown in FIGS. 3A-3E may be repeated periodically (e.g., every 500 msec) to continuously characterize the optical fiber 54 and adjust the visible light as needed based on the characterization. For example, if the connector 56 is removed from the port 52 before the test device 50 is turned off, the OTDR analysis can quickly detect aspects of the OTDR trace that would indicate that the connection has been broken. Therefore, the test device 50 can immediately turn off the visible light source or reduce the visible light source to a low safe level.

Again, it may be noted that conventional VFLs typically operate at a single power level to produce light at a single intensity level. However, in contrast to conventional VFLs, the optical fiber testing apparatus 10 and test device 50 of the present disclosure, according to the various embodiments described herein, are capable of varying the power and hence varying the light intensity emitted from the singular optical port 12 or port 52 of the respective devices. By enabling this variability of light intensity, the embodiments of the present disclosure are capable of producing light for testing fiber optic cables at a low level to minimize the risk of damage to the human eye, while also allowing the light intensity to be increased in a safe, controlled manner when the low levels of light might otherwise be imperceptible during testing.

The testing devices of the present disclosure may be configured to vary the amount of power provided to a light source to thereby vary the light intensity. The systems and methods of the present disclosure may be configured to allow the testing devices to power ON at a low power level to initially emit a low light intensity level. The low light intensity level may be related to a generated output power of about 1.0 mW, which is generally a safe level posing little or no risk to the eyes of the user or other people who may be near the near end of the fiber optic cables under test and/or near the far end of the fiber optic cables or other downstream fibers or equipment. That is, when the testing devices are first powered ON, the intensity of the light may initially be set to a safe level. If it is determined that the power can be boosted, based on the characterization of the fiber optic cables, then the testing devices can increase the power level accordingly.

Figure 4:
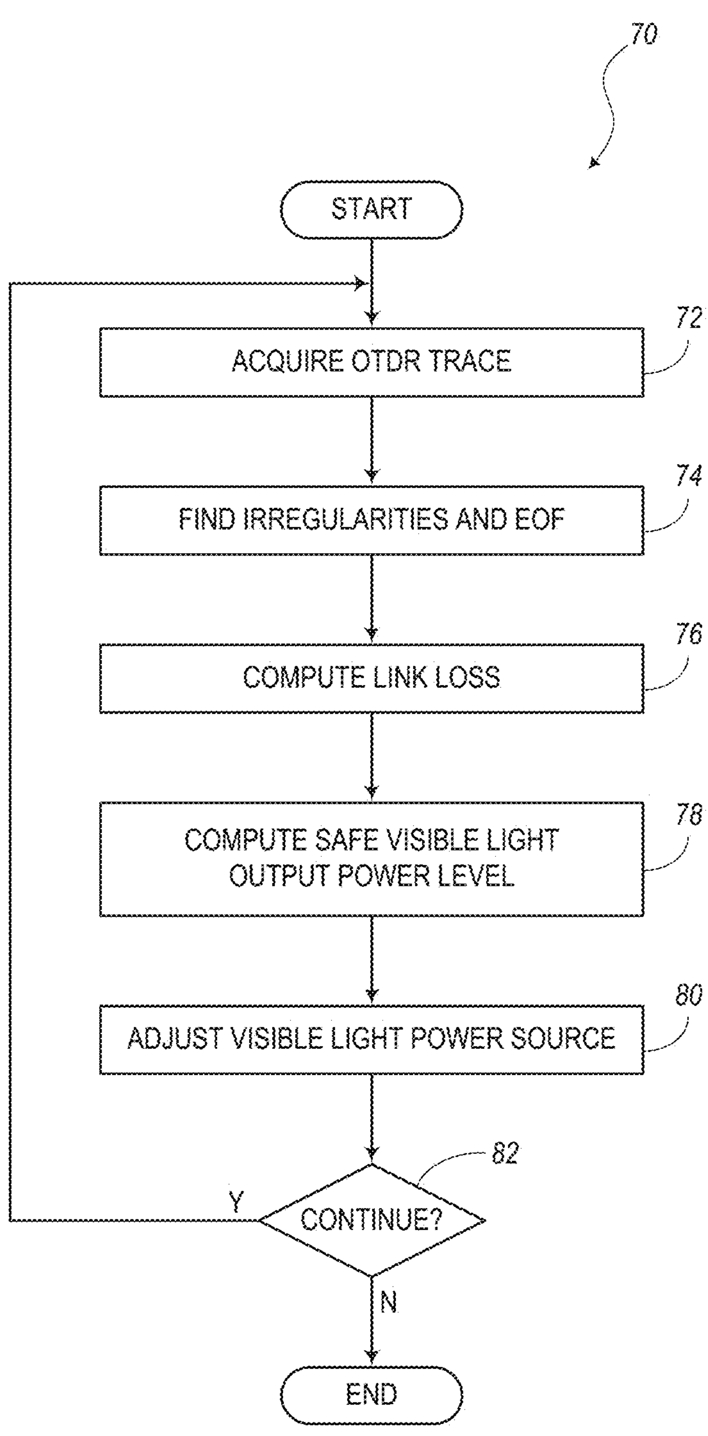
FIG. 4 is a flow diagram illustrating a method for testing an optical fiber by adjusting the power level of a visible light source based on the acquisition of one or more OTDR traces, according to various embodiments.

FIG. 4 is a flow diagram illustrating a method 70 for testing an optical fiber by adjusting the power level of a visible light source of a testing device based on a characterization of the optical fiber or acquisition of one or more OTDR traces. The method 70 may also include the steps discussed with respect to the sequence of FIGS. 3A-3E. The method 70 may illustrate an OTDR procedure to adjust dynamically the power of a visible light source (or other VFL-related source) via an OTDR acquisition. Once started, the method 70 may continuously acquire OTDR traces and adjust the VFL power to a safe value dynamically.

As shown, the method 70 includes acquiring an OTDR trace, as indicated in block 72. The method 70 also includes finding events (e.g., faults, inconsistencies, bends, splices, breaks, discontinuities, etc.), as indicated in block 74. Next, the method 70 includes the step of computing link loss, as indicated in block 76, which may be based on or may be calculated from the OTDR trace and detected events. The method 70 further includes computing a safe visible light output power level, as indicated in block 78. After this computation, the method 70 further includes adjusting the visible light power source, as indicated in block 80. The power source can be adjusted to compensate for attenuation due to loss metrics, distance metrics, inherent attenuation metrics, etc. The method 70 is then configured to determine whether or not to repeat the OTDR acquisition, analysis, and power adjustment steps in a continuous manner, as indicated in condition diamond 82. To continue, the method 70 returns back to block 72. Otherwise, the method 70 ends.

Figure 5:
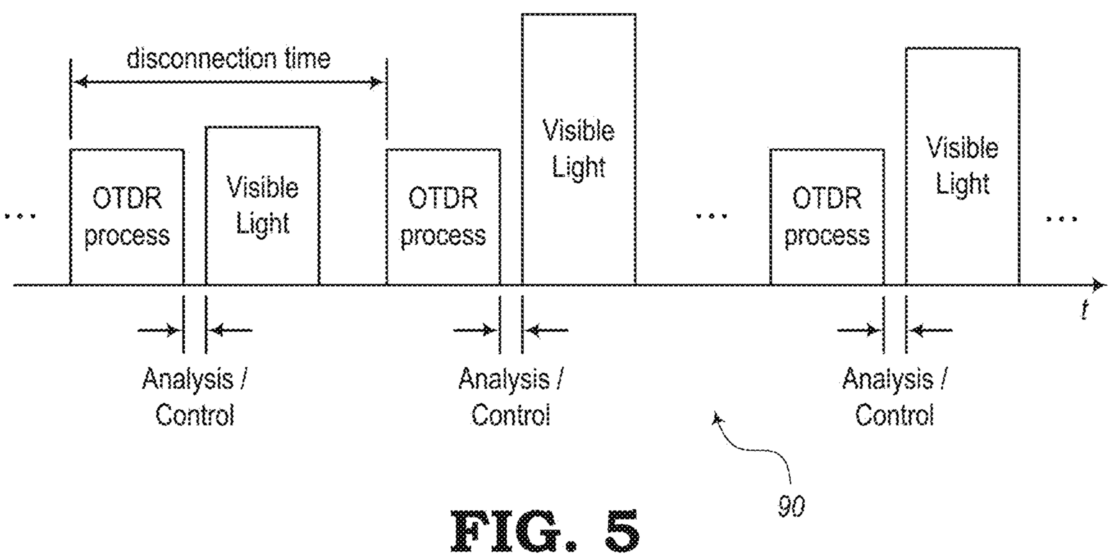
FIG. 5 is a timing diagram illustrating one embodiment of the operation of the optical fiber testing apparatus of FIG. 1 where two optical sources are used one at a time.

FIG. 5 is a timing diagram 90 illustrating one embodiment of the operation of the optical fiber testing apparatus 10 and/or testing device 50. The timing diagram 90 corresponds to an implementation in which two different optical power source are configured to operate one at a time. That is, a first optical power source may correspond to the optical test unit 18 for transmitting OTDR pulses and receiving OTDR reflections. A second optical power source may correspond to the visible light source 24 for transmitting visible light that can be seen by a technician. The separation of the power sources into different time windows may be the result of operating the coupler 14 as a WDM that can select one input at a time. In this case, the visible light filter 16 may not be needed and can be omitted in these embodiments.

As shown in FIG. 5, an OTDR process may be performed over a certain amount of time. Then, analysis of the OTDR trace and control of the visible light source can be performed over a subsequent amount of time (e.g., by the analysis and control device 20). After this, the visible light source may be turned on at the adjusted power level and stay on for a predetermined amount of time. In some embodiments, the visible light source may be turned off and there may be a slight delay before the next OTDR process is repeated. The visible light source is turned off during OTDR acquisition to ensure that the Avalanche Photodetector (APD) (or avalanche photodiode) of the optical power meter associated with the OTDR process is not affected by the visible light retro diffused light level.

The timing diagram 90 also shows a disconnection time from the start of one OTDR process to the start of the next OTDR process. This disconnection time may be used to prevent the exposure of an unsafe visible light for an extended amount of time in the event that there is a sudden change to the optical fiber (e.g., the optical fiber being disconnected from the testing device). It may also be noted from the time diagram 90 of FIG. 5 that the visible light may be adjusted to different levels based on the prior OTDR process.

The connection/disconnection operation may be a matter of hundreds of milliseconds. To keep the visible light output power at a safe level, the duration of the OTDR process (or acquisition of an OTDR trace) and the adjustment of the visible light level may be less than the disconnection time. In some embodiments, the disconnection time may be less than about 500 msec.

Figure 6:
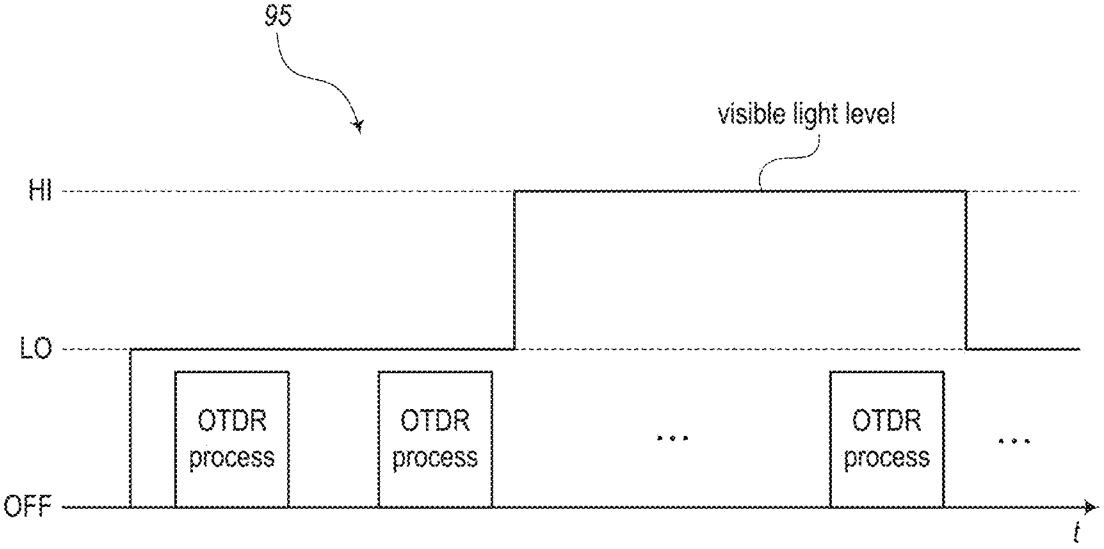
FIG. 6 is a timing diagram illustrating another embodiment of the operation of the optical fiber testing apparatus of FIG. 1 where two optical sources are used simultaneously.

FIG. 6 is a timing diagram 95 illustrating another embodiment of the operation of the testing devices described herein. In this embodiment, the light sources may be configured to operate in an overlapping manner. For example, when the testing device is first turned on, the visible light level may be increased from zero (OFF) to a low level (e.g., safety mode). The visible light level may remain at the low level until an OTDR process determines that it is safe to be increased to a higher level. Then, at a later time, it may be determined by an OTDR process that the visible light level should be returned to the low level again (e.g., if the optical fiber is disconnected from the testing device). In this embodiment, there are three power levels for the visible light (i.e., OFF, LO, HI). It may be noted that the high level may be adjustable in some embodiments.

In some embodiments, the OTDR processes of FIGS. 5 and 6 may be configured to inject OTDR pulses at a predetermined power level. However, in some embodiments, such as the techniques described with respect to U.S. Pat. No. 9,641,243, the OTDR power levels can also be adjusted as needed for safety reasons. In this patent, the OTDR test device can dynamically adjust the power of the OTDR test light as a function of the length of the optical fiber under test. The goal, in this case, may be to protect an SFP that would be connected at the other end of the optical fiber under test.

The OTDR process can dynamically adjust the power of the visible light source via real time OTDR acquisition. The OTDR process can adjust the power level to the appropriate level (e.g., LO to HI). In this embodiment, the visible light power level remains on during the following OTDR acquisitions. This embodiment may require the use of the visible light filter to avoid affecting the OTDR APD. This embodiment is more flexible in terms of control of the visible light source since the tight OTDR/VFL timing is decoupled.

In another aspect, the OTDR can detect if a fiber is connected to the output port (e.g., using signal analysis to detect an event at the output port of the testing device (e.g., at length or distance 0 on the OTDR trace) and start the visible light source only if an optical fiber is connected to the output port. In another implementation, when the optical fiber is shorter than a specified length threshold, the OTDR can indicate that the fiber is broken and start the visible light source in a safe mode.

FIGS. 7A-7C are schematic diagrams illustrating various embodiments of testing systems in which an Optical Loss Test Set (OLTS) device is connected to one or both ends of an optical fiber under test. In FIG. 7A, a test arrangement 100 includes OLTS 102 and OLTS 104 connected to opposites ends of an optical fiber 106 to be tested. The OLTS 102 is connected to a proximal end of the optical fiber 106 at a proximal connector 108 and the OLTS 104 is connected to a distal end of the optical fiber 106 at a distal connector 110.

The OLTS 102 includes a coupler 112 connected to the proximal connector 108, an OLTS light source 114, an OLTS power meter 116, and a visible light source 118. Similarly, the OLTS 104 includes a coupler 122 connected to the distal connector 110, an OLTS light source 124, an OLTS power meter 126, and a visible light source 128. According to some embodiments, the OLTS power meters 116, 126 may be configured as optical test units (e.g., similar to the optical test unit 18 shown in FIG. 1) and may also be configured as analysis and control devices (e.g., similar to the analysis and control device 20).

In operation, the OLTS light source 114 sends a signal (e.g., "ping") to the OLTS 104 via the coupler 112 and optical fiber 106. If the optical fiber 106 is properly connected to the proximal connector 108 and distal connector 110, this signal will be received by the OLTS 104 and provided to the OLTS power meter 126, which can surmise that there is connectivity with the OLTS 102. The OLTS power meter 126 may also configure to control the visible light source 128 to cause the visible light source 128 to provide visible light at a certain intensity, which may be visible by a technician along the optical fiber 106 if there is leakage. The visible light source 128 may provide a boosted power if it is determined that the connectivity status is positive. Otherwise, the visible light source 128 may be set to a low level or turned off.

Also, upon receipt of the signal from the OLTS 102, the OLTS power meter 126 may be configured to control the OLTS light source 124 to send a return signal (e.g., "pong") to the OLTS 102 via the coupler 122 and optical fiber 106. Similarly, the OLTS power meter 116 can detect the connectivity status and control the visible light source 118 and OLTS light source 114 accordingly. Thus, visible light can be provided at both ends of the optical fiber. Because of attenuation of the visible light in both directions, it may be noted that the sum of the emitted light at any point along the optical fiber 106 may be substantially level, thereby allowing safe viewing by a technician at any point. Thus, the detection of connectivity may be the primary concern in this scenario. Thus, the visible light sources 118, 128 may be reduced in power when connectivity is broken and the connectivity checks in a looping fashion indicate a disconnection of one or both of the proximal connector 108 and distal connector 110. As soon as one of OLTS 102 or OLTS 104 is disconnected from the optical fiber, both instruments will detect that continuity is lost. This may be done in a fraction of a second by constantly sending the OLTS light signals from the OLTS light sources 114, 124 and monitoring in a loop any incoming signal from the other end.

Having the visible light sources 118, 128 inline, the same test ports can allow the respective OLTS 102, 104 to automatically turn ON the visible light sources 118, 128, respectively. In some embodiments, a high power visible light emission may only be activated if connection to the optical fiber 106 is confirmed and/or when the instrument at the other end is detected. The visible light sources 118, 128 can be quickly turned OFF (or dropped to a low level) when the continuity is lost. In this kind of implementation, it is unlikely that unintentional direct eye contact will occur. The continuity check ensures the light coming from the port is injected in the link and the link is not "open" at the far end.

In some embodiments, the visible light sources 118, 128 could be turned ON at a safe power level when there is no continuity between the instruments and automatically boosted to a higher power when the instruments are connected together, even when the higher power may normally be above a safe level.

The concurrent use of the visible light sources 118, 128 with the continuity feature could be possible with various types of instruments for several reasons. For example, some power meter technologies (for measuring optical power) may be very sensitive to the wavelength used for VFL (e.g., around 650 nm) while Indium Gallium Arsenide (InGaAs) detectors may have a sensitivity range from about 800 nm to about 1700 nm. Other photodiode detectors may include Germanium (Ge). Also, concurrent use of visible light and continuity features may be possible because no power sensitive measurements are normally performed during the continuity check.

Also, in some other embodiments, if visible light affects the continuity feature, it could be "interlaced" with the continuity signal and pulsed at the most convenient moment to not affect signal reading capacity. The pulse frequency and duration may still be high enough so the user could only see continuous lighting. A strategy which is similar to the OTDR approach is described above.

Visible light may be present on the two instruments (e.g., OLTS 102 and OLTS 104) and may be automatically activated to better cover each side of the optical fiber 106. This could increase the chances of finding the issue where the light is more attenuated at the opposite end of the visible light location. By the way, the light from each side will attenuate substantially linearly, so it would inherently be strongest at its source, but since both sides are providing visible light, the strength of the light signals will be substantially constant when the two are added up.

In FIG. 7B, a test arrangement 130 includes OLTS 132 and OLTS 134 in a duplex scenario. In this test arrangement 130, a first fiber 136 and second fiber 138 are being tested, where OLTS 132 and OLTS 134 are connected to opposites ends of the first and second fibers 136, 138. The OLTS 132 is connected to a proximal end of the first and second fibers 136, 138 at proximal connections and the OLTS 134 is connected to a distal end of the first and second fibers 136, 138 at distal connections.

Similar to FIG. 7A, the OLTS 132 includes a coupler 142 connected to the proximal connector of the first fiber 136, an OLTS light source 144, an OLTS power meter 146 connected to a proximal end of the second fiber 138, and a visible light source 148. Also, the OLTS 134 includes a coupler 152 connected to the distal connector of the second fiber 138, an OLTS light source 154, an OLTS power meter 156 connected to a distal end of the first fiber 136, and a visible light source 158. According to some embodiments, the OLTS power meters 146, 156 may be configured as optical test units (e.g., similar to the optical test unit 18 shown in FIG. 1) and may also be configured as analysis and control devices (e.g., similar to the analysis and control device 20).

The operation of the OLTS 132 and OLTS 134 in this test arrangement 130 is similar to the explanation provided with respect to FIG. 7A. Alternatively, some OLTS devices may be configured to operate on duplex fiber links with inline visible light insertion. Duplex continuity ensures that both fibers are in closed loops and no end is open for direct eye contact. One of the two links or the two links could be lit with the visible light present on each side of the link.

FIG. 7C shows another test arrangement 160 involving an OLTS 162 (at a proximal end) and a remote network device having a distal source 164, where the OLTS 162 and distal source 164 are connected to opposite ends of an optical fiber 166 to be tested. Again, visible light can be inserted inline within the continuity testing system. In operation, the test arrangement 160 includes the same procedures whereby the distal source 164 is configured to respond in a way where continuity can be checked.

In some implementations, the OLTS 162 may be configured where inline visible light is used. An active telecom equipment (having the distal source) sends light toward the OLTS 162 from the distal end of the link. The telecom equipment could be replaced, in some cases, with an active external source. When the OLTS 162 detects light on the same port used to emit visible light, the OLTS 162 confirms that the link is in closed loop and no direct eye contact is possible. As soon as one of the two ends of the link is disconnected, the OLTS 162 stops receiving light and immediately lowers the power level of the visible light source or turns it off. Since the visible light may have a wavelength (e.g., 650 nm) that is outside of operational network wavelengths (e.g., typically within the range of about 1300 nm to about 1600 nm in single-mode fibers and about 850 nm to about 1300 nm in multi-mode fibers), this allows the visible light operation without conflicting with telecom equipment. Out-of-band test equipment also exists, which may be in the form of an OTDR operating at 1625 nm or 1650 nm, for example.

FIGS. 8A and 8B are schematic diagrams illustrating various embodiments of testing systems in which an enhanced VFL device (or high-end VFL device) is connected to one or both ends of an optical fiber under test. The enhanced VFL devices can combine live fiber detection capacity with VFL-type (visible light) sources on the same optical port. Even if these VFLs were more expensive than traditional VFL, they might still be less expensive than OLTS devices. Live fiber detection may be based on power detectors which are sensitive to VFL wavelength at around 650 nm. The power detector should be sensitive to wavelengths normally used in optical transmission as well as the visible light around 650 nm.

FIG. 8A shows a test arrangement 170 in which a first enhanced VFL 172 is connected at a proximal end of an optical fiber 173 under test and a second enhanced VFL 174 is connected at a distal end of the optical fiber 173. The first enhanced VFL 172 includes a coupler 180, a live fiber detector 182, and a visible light source 184. The live fiber detector 182 may include some functionality as described above with respect to the optical test unit 18 and the analysis and control device 20. However, the live fiber detector 182 detects if the optical fiber 173 is live or active and is configured to control the visible light source 184 accordingly. Similarly, the second enhanced VFL 174 includes a coupler 190, a live fiber detector 192, and a visible light source 194. The live fiber detector 192 may include some functionality as described above with respect to the optical test unit 18 and the analysis and control device 20. However, the live fiber detector 192 detects if the optical fiber 173 is live or active and is configured to control the visible light source 194 accordingly. This test arrangement 170 may also be configured for detecting continuity or liveness of the optical fiber 173 from both ends.

FIG. 8B shows a test arrangement 200 in which an enhanced VFL 202 is connected at a proximal end of an optical fiber 203 under test and a telecom device having a distal source 204 is connected at a distal end of the optical fiber 203. The enhanced VFL 202 includes a coupler, a live fiber detector, and a visible light source and may be configured to operate similarly to the first and second enhanced VFLs 172, 174 shown in FIG. 8A. The live fiber detector may include some functionality as described above with respect to the optical test unit 18 and the analysis and control device 20. However, the live fiber detector detects if the optical fiber 203 is live or active and is configured to control the visible light source accordingly. Alternatively, the enhanced VFL 202 has live fiber detection capacity on the VFL port. Detection technology of the live fiber detector may respond to network and VFL wavelengths of the distal source 204 to support various use cases.

Advanced live fiber detection capacity may provide an indication of a power level in the form of "bars" having, for example, five power levels. This may also be known as a "power checker" which may be an optical power meter with less accuracy. In some use cases, this kind of device could represent a solution with the best cost/benefit replacing a basic power meter and a basic high-power VFL device with a single unit.

Again, the enhanced VFL 202 may be configured to operate with inline VFL on a singular output port. An active telecom equipment (having the distal source 204) may send light toward the enhanced VFL 202 on the proximal end of the link. The telecom equipment could be replaced with an active external source. When the light is detected on the same port used to emit VFL light, the enhanced VFL 202 may confirm that the link is in closed loop state and no direct eye contact would normally be possible. As soon as one of the two ends of the link is disconnected, the enhanced VFL 202 may be configured to stop receiving light and immediately lower or turn off the visible light source.

Therefore, according to various embodiments described with respect to FIG. 1-8, the present disclosure may be directed to an optical fiber testing apparatus (e.g., optical fiber testing apparatus 10) including an optical test unit configured to obtain a characterization of an optical fiber to be tested. The optical fiber testing apparatus may also include a visible light source and may further include an analysis and control device configured to adapt the visible light source to a specific power level based on the characterization of the optical fiber.

In some embodiments, the optical fiber testing apparatus may be configured whereby the characterization of the optical fiber can include at least a fiber length metric calculated from the optical fiber testing apparatus to a distal end of the optical fiber. The characterization of the optical fiber may further include a loss metric related to each of one or more events in the optical fiber. The loss metric may be related to a power loss associated with the respective event. The specific power level, in these embodiments, to which the visible light source is set, may be based on a) the fiber length metric, b) the loss metric of each event, and/or c) an inherent attenuation characteristic of the optical fiber. The optical test unit may be configured to apply a test pulse to the optical fiber and receive a reflection signal from the optical fiber, and the analysis and control device may be configured to perform a signal analysis procedure on the reflection signal to detect one or more events of the optical fiber and to detect a length to the end of the optical fiber. Of note, a link could have multiple events, and it is the sum of the events and the normal attenuation of the link that will set how strong the VFL can be lighted. The optical test unit and the analysis and control device may be configured to use OTDR technology. Each event, for example, may be a fault, a break, a crack, a splice, a substantial bend, or an intermediate connector.

According to additional embodiments, the characterization of the optical fiber may include at least a connectivity status related to a) a first connection between a proximal end of the optical fiber and the optical fiber testing apparatus and b) a second connection between of a distal end of the optical fiber and a cooperating testing device. The specific power level, to which the visible light source is set, may be based on the connectivity status. The optical fiber testing apparatus and cooperating testing device may be arranged in an Optical Loss Test Set (OLTS) configuration, where the cooperating testing device may be another OLTS device, an enhanced Visual Fault Locator (VFL) device, or a distal optical network device having an optical source.

The optical fiber testing apparatus may also include a coupler and a singular optical port, where the singular optical port may be configured for connection with the optical fiber. The coupler may be configured to enable the optical test unit to transmit optical test pulses to the optical fiber via the coupler and singular optical port and to receive reflection signals from the optical fiber via the singular optical port and coupler. The visible light source may be configured to apply visible light at the specific power level to the optical fiber via the coupler and singular optical port. Furthermore, the optical test pulses may include one or more wavelengths within a range of about 850 nm to about 1650 nm, and the visible light may include one or more wavelengths within a range of about 400 nm to about 700 nm.

The analysis and control device may be configured to cause the coupler to switch between a characterization mode and a visible light mode. The characterization mode, for example, may enable the passage of the optical test pulses and reflection signals through the coupler. Also, the visible light mode, for example, may enable the passage of the visible light through the coupler.

In other embodiments, the optical fiber testing apparatus may further comprise a visible light filter arranged between the optical test unit and the coupler, and the coupler may be configured as a fiber optic coupler or Y-coupler. For example, the coupler may be configured to enable the passage of the visible light from the visible light source simultaneously with the passage of the optical test pulses and reflection signals with respect to the optical test unit. The visible light filter may be configured to reduce potential damage to a photodetector of the optical test unit caused by incoming signals of visible light.

The step of obtaining the characterization of the optical fiber and adapting the visible light source accordingly may be repeated periodically to respond to changes in the optical fiber occurring in real time. The analysis and control device may be configured to boost the power of the visible light source to such a level that a) application of the boosted power to the optical fiber results in escaping light being emitted outside the optical fiber at an intensity that is safely detectable by the human eye, and b) detection range of the optical fiber testing apparatus is increased.

FIG. 9 is a flow diagram illustrating an embodiment of a method 210 for testing an optical fiber. The method 210 includes the step of obtaining a characterization of an optical fiber to be tested, as indicated in block 212. Also, the method 210 includes the step of providing visible light at a specific power level based on the characterization, as indicated in block 214.

The step of obtaining the characterization (block 212) may further include the steps of a) transmitting an OTDR test pulse on a proximal end of the optical fiber, b) scanning the optical fiber to obtain an OTDR trace, and c) analyzing the OTDR trace to determine a fiber length metric related to a distance along the optical fiber from a scanning location to a distal end of the optical fiber. Furthermore, the step of obtaining the characterization (block 21) can also include the step of analyzing the OTDR trace to determine one or more events in the optical fiber and to determine a loss metric related to each of the one or more events. For example, the loss metric may be related to a power loss associated with the respective event.

In some embodiments, the step of obtaining the characterization (block 212) may include the step of determining a connectivity status of a distal end of the optical fiber with respect to a cooperating testing device. Also, the step of providing the visible light at the specific power level (block 214) may be based on the connectivity status. According to some implementations, the step of obtaining the characterization (block 212) may include the step of transmitting and receiving test signals via a singular optical port connected to the optical fiber, wherein the step of providing the visible light (block 214) may include the step of transmitting the visible light to the optical fiber via the singular optical port. In some embodiments, obtaining the characterization of the optical fiber (block 212) and adapting the visible light source accordingly (block 214) may be repeated periodically to respond to changes in the optical fiber occurring in real time.

CONCLUSION

Therefore, the present disclosure describes various embodiments of fiber testing devices capable of operating visible light sources at different power levels. In a particular generalized implementation, a VFL may simply include a) an output port configured for connection with an optical fiber to be tested and b) a variable light source configured to emit visible light at different power levels from the output port. For example, the different power levels may correspond with different light intensity levels. In some embodiments, the VFL may be incorporated in a) a Live Fiber Detector (LFD), b) a photonic multiplexing/demultiplexing component, c) a photonic network component, or other devices.

According to additional embodiments, the VFL may also include a gain control device connected to the variable light source. The gain control device, for example, may be configured to control the power of the variable light source to enable the variable light source to emit the visible light at multiple power levels. The multiple power levels, for instance, may include one or more lower levels below class 2M and one or more high levels from class 3R or more. The gain control device may be configured to control the power of the variable light source based on a detected characterization of the optical fiber itself, such as by using OTDR techniques. The gain control device may increase the power of the variable light source from a low level to a high level when the characterization indicates that the power level of visible light from an inline visible light source will naturally attenuate to a safe level at the point along the optical (or EOF) where light might escape and exposure of that escaping light to a technician will not cause damage to his or her eyes. Also, the gain control device may be configured to increase the power from the low level to the high level in multiple steps.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. An optical fiber testing apparatus comprising:

an optical test unit comprising a photodetector configured to obtain a characterization of an optical fiber to be tested;

a visible light source; and an analysis and control device comprising circuitry connected to the optical test unit and the visible light source and configured to adapt the visible light source to a specific power level based on the characterization of the optical fiber, wherein the analysis and control device is configured to boost the power of the visible light source to such a level that a) application of the boosted power to the optical fiber results in escaping light being emitted outside the optical fiber at an intensity that is safely detectable by a human eye, and b) detection range of the optical fiber testing apparatus is increased.

2. The optical fiber testing apparatus of claim 1, wherein the characterization of the optical fiber includes at least a fiber length metric calculated from the optical fiber testing apparatus to a distal end of the optical fiber.

3. The optical fiber testing apparatus of claim 1, wherein the specific power level, to which the visible light source is set, is based at least on a) a fiber length metric, and b) an inherent attenuation characteristic of the optical fiber.

4. The optical fiber testing apparatus of claim 1, wherein:
the characterization of the optical fiber includes a loss metric related to each of one or more events along the optical fiber,
the loss metric is related to a power loss associated with the respective event.

5. The optical fiber testing apparatus of claim 1, wherein the specific power level, to which the visible light source is set, is based on one or more of a) a fiber length metric, b) loss metric of each event along the optical fiber, and c) an inherent attenuation characteristic of the optical fiber at a wavelength of the visible light source.

6. The optical fiber testing apparatus of claim 1, wherein:
the optical test unit is configured to apply a test pulse to the optical fiber and receive a reflection signal from the optical fiber, and
the analysis and control device is configured to perform a signal analysis procedure on the reflection signal to detect one or more events along the optical fiber and to detect a length to a distal end of the optical fiber.

7. The optical fiber testing apparatus of claim 6, wherein each event is one of a fault, a break, a crack, a splice, a substantial bend, and an intermediate connector.

8. The optical fiber testing apparatus of claim 1, wherein the optical test unit and the analysis and control device use Optical Time Domain Reflectometry (OTDR) technology.

9. Optical fiber testing apparatus of claim 1, wherein the characterization of the optical fiber includes at least a connectivity status related to a) a first connection between a proximal end of the optical fiber and the optical fiber testing apparatus and b) a second connection between of a distal end of the optical fiber and a cooperating testing device.

10. The optical fiber testing apparatus of claim 9, wherein:
the specific power level, to which the visible light source is set, is based on a connectivity status,
the optical fiber testing apparatus and cooperating testing device are arranged in an Optical Loss Test Set (OLTS) configuration, and
the cooperating testing device is one of an OLTS device, enhanced Visual Fault Locator (VFL) device, distal optical network device having an optical source, and a combination thereof.

11. The optical fiber testing apparatus of claim 1, further comprising a coupler and a singular optical port, the singular optical port being configured for connection with the optical fiber, wherein:
the coupler is configured to enable the optical test unit to transmit optical test pulses to the optical fiber via the singular optical port and to receive reflection signals from the optical fiber via the singular optical port, and
the visible light source is configured to apply visible light at the specific power level to the optical fiber via the coupler and singular optical port.

12. The optical fiber testing apparatus of claim 11, wherein:
the optical test pulses include one or more wavelengths within a range of about 850 nm to about 1650 nm, and
the visible light includes one or more wavelengths within a range of about 400 nm to about 700 nm.

13. The optical fiber testing apparatus of claim 11, further comprising a visible light filter arranged between the optical test unit and the coupler, wherein:
the coupler is configured as a fiber optic coupler or Y-coupler to enable passage of the visible light from the visible light source simultaneously with passage of the optical test pulses and reflection signals with respect to the optical test unit, and
the visible light filter is configured to reduce potential damage to a photodetector of the optical test unit caused by incoming signals of visible light.

14. The optical fiber testing apparatus of claim 1, wherein obtaining the characterization of the optical fiber and adapting the visible light source accordingly are repeated periodically to respond to changes in the optical fiber occurring in real time.

15. A method implemented by an optical fiber testing apparatus, the method comprising steps of:
obtaining a characterization of an optical fiber to be tested;
providing visible light, to the optical fiber, at a specific power level based on the characterization; and
boosting the power of the visible light source to such a level that a) application of the boosted power to the optical fiber results in escaping light being emitted outside the optical fiber at an intensity that is safely detectable by a human eye, and b) detection range of the optical fiber testing apparatus is increased.

16. The method of claim 15, wherein the step of obtaining the characterization includes the steps of:
transmitting an Optical Time Domain Reflectometry (OTDR) test pulse on a proximal end of the optical fiber;
scanning the optical fiber to obtain an OTDR trace; and
analyzing the OTDR trace to determine a fiber length metric related to a distance along the optical fiber from a scanning location to a distal end of the optical fiber.

17. The method of claim 15, wherein the step of obtaining the characterization includes the step of determining a connectivity status of a distal end of the optical fiber with respect to a cooperating testing device, and wherein the step of providing the visible light at the specific power level is based on the connectivity status, such that power is turned on once connectivity is determined.

18. The method of claim 15, wherein the step of obtaining the characterization includes the step of transmitting and receiving test signals via a singular optical port connected to the optical fiber, and wherein the step of providing the visible light includes the step of transmitting the visible light to the optical fiber via the singular optical port.

19. The method of claim 15, wherein the specific power level, of the visible light, is based at least on a) a fiber length metric, and b) an inherent attenuation characteristic of the optical fiber.

20. An optical fiber testing apparatus comprising:
an optical test unit comprising a photodetector configured to obtain a characterization of an optical fiber to be tested;
a visible light source;
an analysis and control device comprising circuitry connected to the optical test unit and the visible light source and configured to adapt the visible light source to a specific power level based on the characterization of the optical fiber; and
a coupler and a singular optical port, the singular optical port being configured for connection with the optical fiber, wherein:
the coupler is configured to enable the optical test unit to transmit optical test pulses to the optical fiber via the singular optical port and to receive reflection signals from the optical fiber via the singular optical port,
the visible light source is configured to apply visible light at the specific power level to the optical fiber via the coupler and singular optical port, and the analysis and control device is configured to boost the power of the visible light source to such a level that a) application of the boosted power to the optical fiber results in escaping light being emitted outside the optical fiber at an intensity that is safely detectable by a human eye, and b) detection range of the optical fiber testing apparatus is increased.

* * * * *